(12) United States Patent
Chawla et al.

(10) Patent No.: US 6,214,899 B1
(45) Date of Patent: *Apr. 10, 2001

US006214899B1

(54) RADIATION-CURABLE FIBER OPTIC MATERIALS HAVING REDUCED MOISTURE CONTENT

(75) Inventors: Chander P. Chawla, Batavia; Steven R. Schmid, Long Grove; John M. Zimmerman, Crystal Lake; James M. Julian, Schaumburg, all of IL (US)

(73) Assignee: DSM N.V., Heerlen (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/852,082

(22) Filed: May 6, 1997

Related U.S. Application Data

(60) Provisional application No. 60/017,040, filed on May 7, 1996.

(51) Int. Cl.[7] .................................................. C08G 18/48
(52) U.S. Cl. .............................. 522/84; 522/85; 522/96; 522/172; 528/25; 528/26
(58) Field of Search ................................ 522/84, 85, 96, 522/172; 528/25, 26; 524/837; 428/375; 385/145

(56) References Cited

U.S. PATENT DOCUMENTS

| | | | |
|---|---|---|---|
| 4,087,585 | * 5/1978 | Schulz | 428/429 |
| 4,624,994 | 11/1986 | Ansel | 525/440 |
| 4,682,851 | 7/1987 | Ansel | 350/96.34 |
| 4,782,129 | 11/1988 | Moschovis et al. | 528/49 |
| 4,794,133 | 12/1988 | Moschovis et al. | 524/99 |
| 4,806,574 | 2/1989 | Krajewski et al. | 522/96 |
| 4,849,462 | 7/1989 | Bishop | 522/97 |
| 4,932,750 | 6/1990 | Ansel | 350/96.34 |
| 5,219,896 | 6/1993 | Coady et al. | 522/96 |
| 5,336,563 | 8/1994 | Coady et al. | 428/375 |
| 5,461,691 | 10/1995 | Schunck et al. . | |
| 5,527,835 | 6/1996 | Shustack | 522/42 |

FOREIGN PATENT DOCUMENTS

| | | |
|---|---|---|
| 95/15928 | 6/1995 | (WO) . |
| 95/23772 | 9/1995 | (WO) . |

* cited by examiner

*Primary Examiner*—Rachel Gorr
(74) *Attorney, Agent, or Firm*—Pillsbury Winthrop LLP

(57) ABSTRACT

A method of making radiation-curable, fiber optic materials having extended shelf-life and reduced water content which when suitably cured provide reliable and consistent adhesion characteristics to optical glass fibers.

16 Claims, No Drawings

RADIATION-CURABLE FIBER OPTIC MATERIALS HAVING REDUCED MOISTURE CONTENT

This application claims benefit of U.S. Provisional Application No. 60/017,040 filed May 7, 1996.

FIELD OF THE INVENTION

This invention provides a method for making radiation-curable fiber optic materials having an extended shelf-life, and in particular, materials which comprise hydrolyzable glass coupling agent and which have reduced moisture content.

DESCRIPTION OF RELATED ART

Optical glass fibers are frequently coated with two or more superposed radiation-curable coatings, which together form a primary coating. The coating which contacts the optical glass fiber is called the "inner primary" coating and the overlaying coating is called the "outer primary" coating. Alternatively, the inner primary coating may simply be called the "primary" coating and the outer primary coating the "secondary" coating. Other optical fiber materials include matrix materials, inks, and bundling materials. All of these fiber optic materials are preferably radiation-curable and are within the scope of the present invention. Coated optical fibers can be incorporated into ribbon and cable structures.

The inner primary coating is usually a soft coating providing resistance to microbending. Microbending is associated with attenuation of the signal transmission capability of the coated optical glass fiber and is therefore undesirable. The outer primary coating is typically a harder coating providing desired resistance to handling forces such as those encountered when the fiber is cabled.

Inner primary coatings are a particular focus for the present invention. Coating compositions for making inner primary coatings generally comprise a polyethylenically unsaturated monomer or oligomer dissolved or dispersed in a liquid ethylenically unsaturated medium. These coating compositions also generally include a glass adhesion promoter which provides a link between the polymer inner primary coating and the surface of the optical glass fiber. Silane coupling agents, which are hydrolyzable, have been used as glass adhesion promoters. Silane coupling agents can also be used in so-called single coatings as disclosed in, for example, U.S. Pat. No. 4,932,750. Hydrolyzable silane compounds may also be found in other fiber optic materials besides inner primary and single coatings which directly contact the glass fiber. In this case, the adhesion promoter or coupling agent may not directly function to induce bonding to glass, but nevertheless, it may improve adhesion in general to other components in the optical fiber ribbon or cable structure.

In general, optical glass fibers are weakened upon exposure to water. For example, moisture in air can cause weakening and the eventual breakage of optical glass fibers. It is therefore desirable that the coating system in general and the inner primary coating in particular prevent moisture from attacking the optical glass fiber.

In addition to causing the weakening of the optical glass fibers, moisture can also cause the inner primary coating layer to delaminate from the optical glass fiber. The delamination of the inner primary coating from the optical glass fiber further results in a weakened optical glass fiber, because the inner primary coating can no longer protect the optical glass fiber from attack from moisture. Delamination may also cause attenuation of the signal transmission capability of the coated optical glass fiber.

Hence, it is desirable to use a radiation-curable, inner primary optical glass fiber coating composition that when suitably cured provides a reliable and consistent resistance to delamination from optical glass fibers. However, for certain applications, conventional radiation-curable, optical glass fiber coating compositions may not provide cured inner primary coatings having sufficient reliability and consistency in resistance to delamination caused by moisture. Moreover, when suitable compositions have been formulated, erratic and inconsistent performance on the glass fiber has been observed. For example, when coated optical glass fibers are soaked in water ("water-soak"), different strands of optical glass fiber can show different delamination behavior even though the fiber may have been coated with what was intended to be the same coating.

It has also been found that the resistance to delamination of the cured inner primary coating from an optical fiber decreases with the age or shelf-life of the radiation-curable, optical glass fiber coating composition, and this decrease may be erratic from one batch of composition to another. Such inconsistency can have severe repercussions in optical fiber technology.

Hence, there is a need for a solution to the above performance problems and to provide improved radiation-curable fiber optic materials with better, more consistent characteristics. In particular, improved shelf-life is needed so that, for example, materials can be stored for greater lengths of time. Materials with insufficient shelf life may need to be discarded.

SUMMARY OF THE INVENTION

An objective of the present invention is to provide a process of making radiation-curable fiber optic materials having extended shelf-life and which when suitably cured provide materials having reliable and consistent characteristics, and in particular, adhesion characteristics.

Another objective of the present invention is to provide a radiation-curable, inner primary, optical glass fiber coating composition having extended-shelf life, which when suitably cured provides consistent and reliable adhesion and delamination characteristics to optical glass fibers.

Surprisingly, after extensive testing of the many components in radiation-curable, inner primary, optical glass fiber coating compositions, it has been found that the shelf-life of the uncured coating composition, and the final adhesion characteristics of the cured inner primary coating to the optical glass fiber, are dependent upon the amount of water present in the uncured coating composition.

The present invention is therefore based on the discovery that the amount of water can be carefully controlled when making the radiation-curable, inner primary, optical glass fiber coating composition to provide an extended shelf-life for the uncured composition and to provide a cured inner primary coating having reliable and predictable adhesion characteristics.

In particular, the present invention provides a process for extending the useful shelf-life of radiation-curable resin coating compositions, adapted for use in forming inner primary coatings on optical glass fibers for signal transmission, and which contain a coupling agent having a functionally-effective glass binding group for promoting adhesion to glass fibers and which group is susceptible to hydrolysis under normal shelf storage conditions for the coating composition. The cured coating provides reliable and consistent resistance to delamination from the optical glass fiber.

The process of this invention consists essentially in the steps of establishing and controlling the water content for each component utilized in the preparation of the coating composition such that the ratio of total molar equivalent water content of the final coating composition to the total molar content of the functionally-effective glass binding groups is maintained at a level of less than one.

The invention also provides a process for extending the shelf-life of radiation-curable coating compositions adapted for use in forming inner primary coatings on optical glass fibers for signal transmission and containing a coupling agent having a functional group which bonds with the glass fiber and which is susceptible to hydrolysis under normal shelf storage conditions for the coating composition. The cured coating provides reliable and consistent adhesion to the optical glass fiber. The process consists essentially in the steps of formulating the coating composition from components having sufficiently low respective water contents such that after formulation the ratio of total molar equivalent water content of the formulated coating composition to the total molar equivalent content of the functional groups is less than one.

In known processes for the formulation or production of radiation-curable coating composition adapted for use in forming inner primary coatings on optical glass fibers for signal transmission and including a coupling agent containing at least one functional-effective glass binding group and which is susceptible to hydrolysis under normal shelf storage conditions for the coating composition, the improvement according to the present invention for providing an extended shelf life for the composition consists essentially in the steps of maintaining the total water content of the components used to formulate the composition such that the water content present in the coating composition is an amount less than the stoichiometric amount of water required to react via hydrolysis with the amount of the functional-effective glass binding groups present in the coating composition.

The invention further provides a radiation-curable, inner primary, optical glass fiber coating composition having extended shelf-life and when suitably cured exhibits reliable and consistent resistance to delamination from the optical glass fiber. The coating composition comprises a radiation-curable oligomer or monomer and a coupling agent containing at least one functionally-effective glass binding group capable of bonding to said glass fiber and which is susceptible to hydrolysis under normal shelf storage conditions for said coating composition. The coating composition has a controlled stoichiometric water content less than the stoichiometric amount of the said functional groups present in the coupling agent.

While this invention can be described with reference to radiation-curable, inner primary, optical glass fiber coating compositions, it will be understood that this invention is also applicable to radiation-curable, single-coat compositions which are applied directly to optical glass fibers, and to radiation-curable fiber optic materials in general.

DETAILED DESCRIPTION OF INVENTION

The present invention can be applied to any of the radiation-curable fiber optic materials. In particular, the present invention is applicable to radiation-curable, inner primary, optical glass fiber coating compositions (hereinafter "inner primary composition") containing a coupling agent having a functionally-effective glass binding group which bonds with glass fibers and which is susceptible to hydrolysis under normal shelf storage conditions for the inner primary composition. Examples of suitable inner primary compositions, and ingredients used to formulate the compositions, include those which are disclosed in U.S. Pat. Nos. 4,624,994; 4,682,851; 4,782,129; 4,794,133; 4,806,574; 4,849,462; 5,219,896; and 5,336,563 which are incorporated herein by reference.

The following disclosure principally discusses inner primary coatings. However, a person skilled in the art can adapt these teachings to formulate other types of improved fiber optic materials. The invention is not limited to inner primary coatings.

Inner primary compositions contain one or more radiation-curable oligomers or monomers having at least one functional group capable of polymerization when exposed to actinic radiation. Suitable radiation-curable oligomers or monomers are now well known and within the skill of the art.

Commonly, the radiation-curable functionality used is ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, N-vinyl amide, maleate esters, and fumarate esters. Preferably, the ethylenic unsaturation is provided by a group containing acrylate, methacrylate, or styrene functionality.

Another type of functionality generally used is provided by, for example, epoxy groups, or thiol-ene or amine-ene systems. Epoxy groups in can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

The inner primary coating contains a coupling agent having a functionally-effective glass-binding group which bonds with glass fibers and which is susceptible to hydrolysis under normal shelf storage conditions for the inner primary composition. The coupling agent may contain a plurality of glass-binding groups, all of which may not be functionally-effective glass binding groups. Functionally-effective glass-binding groups is used herein to mean those glass-binding groups which are capable of bonding to optical glass fibers. Silane in hydrolyzed form reacts with glass.

Examples of suitable glass-binding functional groups include methoxy, ethoxy, and butoxy which bond to, for example, silicon in a silane coupling agent. Silane coupling agents can include a variety of functional groups including, for example, mercapto, amino, acrylamido, vinyl, acrylate, methacrylate, epoxy, and allyl. For example, silane coupling agents are disclosed in U.S. Pat. No. 5,527,835, which is hereby incorporated by reference. Mercapto- and vinyl-functional silanes are preferred, and mercaptosilanes are particularly preferred. A preferred example of a suitable coupling agent is gamma-mercaptopropyltrimethyoxysilane.

The inner primary compositions may also contain a reactive diluent which is used to adjust the viscosity of the inner primary composition. The reactive diluent can be a low viscosity monomer containing having at least one functional group capable of polymerization when exposed to actinic radiation. This functional group may be of the same nature as that used in the radiation-curable monomer or oligomer. Preferably, the functional group present in the reactive diluent is capable of copolymerizing with the radiation-curable functional group present on the radiation-curable monomer or oligomer.

For example, the reactive diluent can be a monomer or mixture of monomers having an acrylate or vinyl ether functionality and an $C_4$–$C_{20}$ alkyl or polyether moiety. Particular examples of such reactive diluents include:

hexylacrylate,
2-ethylhexylacrylate,
isobornylacrylate,
decyl-acrylate,
laurylacrylate,
stearylacrylate,
2-ethoxyethoxy-ethylacrylate,
laurylvinylether,
2-ethylhexylvinyl ether,
N-vinyl formamide,
isodecyl acrylate,
isooctyl acrylate,
vinyl-caprolactam,
N-vinylpyrrolidone, and the like.

Another type of reactive diluent that can be used is a compound having an aromatic group. Particular examples of reactive diluents having an aromatic group include:

ethyleneglycolphenylether-acrylate,
polyethyleneglycolphenyletheracrylate,
polypropyleneglycolphenylether-acrylate, and
alkyl-substituted phenyl derivatives of the above monomers, such as polyethyleneglycolnonylphenyl-etheracrylate.

The reactive diluent can also comprises a diluent having two or more functional groups capable of polymerization. Particular examples of such monomers include:

$C_2$–$C_{18}$ hydrocarbon-dioldiacrylates,
$C_4$–$C_{18}$ hydrocarbondivinylethers,
$C_3$–$C_{18}$ hydrocarbon triacrylates, and the polyether analogues thereof, and the like, such as 1,6-hexanedioldiacrylate,
trimethylolpropanetri-acrylate,
hexanedioldivinylether,
triethylene-glycoldiacrylate,
pentaerythritol-triacrylate,
ethoxylated bisphenol-A diacrylate, and tripropylenegly-col diacrylate.

If the radiation-curable functional group of the radiation-curable monomer or oligomer is an epoxy group, for example, one or more of the following compounds can be used as the reactive diluent:

epoxy-cyclohexane,
phenylepoxyethane,
1,2-epoxy-4-vinylcyclohexane,
glycidylacrylate,
1,2-epoxy-4-epoxyethyl-cyclohexane, the diglycidylether of polyethylene-glycol, the diglycidylether of bisphenol-A, and the like.

If the radiation-curable functional group of the radiation-curable monomer or oligomer has an amine-ene or thiol-ene system, examples of reactive diluents having allylic unsaturation that can be used include:

diallylphthalate,
triallyltri-mellitate,
triallylcyanurate,
triallylisocyanurate, and diallylisophthalate. For amine-ene systems, amine functional diluents that can be used include, for example:
the adduct of trimethylolpropane, isophorondiisocyanate and di(m)ethylethanolamine,
the adduct of hexanediol, isophorondiisocyanate and dipropylethanolamine, and
the adduct of trimethylol propane, trimethylhexamethyl-enediisocyanate and di(m)ethylethanolamine.

Other additives which can be used in the inner primary composition include, but are not limited to, light sensitive and light absorbing components, photoinitiators, catalysts, lubricants, wetting agents, antioxidants and stabilizers. The selection of additive will depend on the type of fiber optic material which is being formulated. The selection and use of such additives is within the skill of the art.

Fiber optic materials preferably comprise between about 10 wt. % to about 90 wt. %, and preferably, between about 20 wt. % and 80 wt. % of at least one radiation-curable oligomer. Fiber optic materials also preferably comprise between about 10 wt. % to about 90 wt. %, and preferably, between about 20 wt. % and 80 wt. % of at least one monomer diluent. Photoinitiator, when used, can be present in amounts between about 0.3 wt. % and 10 wt. %, and preferably, between about 1 wt. % and about 6 wt. %. Silane coupling agent is preferably present in amounts between about 0.3 wt. % and about 5 wt. %, and preferably, between about 0.5 wt. % and about 3 wt. %. The amount of silane may be lower depending on the type of fiber optic materials being formulated. For an inner primary coating, silane amounts between about 0.75 wt. % and about 1.5 wt. % are generally suitable.

In a preferred embodiment, an inner primary coating composition consists essentially of as premixture ingredients:

about 30 wt. % to about 70 wt. % of at least one urethane acrylate oligomer, about 30 wt. % to about 70 wt. % of a monomer diluent system comprising at least two monomer diluents, including at least one monomer diluent comprising at least one aromatic group and at least one monomer diluent comprising at least one alkyl group, about 2 wt. % to about 4 wt. % of at least one photoinitiator, about 0.5 wt. % to about 2 wt. % of a mercapto-functional silane coupling agent, wherein the amount of water in the radiation-curable composition, after formulation but before radiation-cure, is less than 0.08 wt. %. In this preferred embodiment for an inner primary coating, antioxidant is also used in small amounts (e.g., 0.1 wt. % to 1 wt. %).

More in particular, in preferred embodiments, the following ingredients are used:

the radiation-curable oligomer preferably comprises polyether repeat units and polycarbonate repeat units, aliphatic urethane linkages, and acrylate end groups;

the diluent system comprises isodecyl acrylate and alkoxylated nonylphenolmonoacrylate;

at least two photoinitiators are present wherein at least one is a monoacylphosphine oxide compound; and the silane adhesion promoter or coupling agent is a mercaptosilane compound.

After extensive testing, it has been unexpectedly found that even if only a small amount of water is present in the fiber optic material as it is formulated, there can be a hydrolytic reaction even during normal shelf storage conditions for the composition. It appears that this reaction occurs with the glass-binding functional groups, i.e., Si—OR, present in the coupling agent. In this manner, the intended content of the functionally effective glass-binding groups will be significantly modified and reduced during normal shelf storage. As a result, the intended and expected performance of the coating composition when used may be erratic and inconsistent and degraded. The reduction in the amount of functional-effective glass-binding functional groups appears to lead to the unreliable and inconsistent adhesion performance characteristics exhibited by the final cured, inner primary coating. In effect, the coating obtained from such a composition after a period of shelf-storage under normal conditions will be significantly degraded from that obtained from a freshly prepared composition. At present, to reliably obtain the desired, undegraded coating performance characteristics, the composition should be used within a relatively short storage time period. That is, the water content of the composition leads to a significantly reduced shelf-life for the uncured inner primary composition.

Therefore, during production of the inner primary composition, the amount of water should be carefully controlled to be less than the amount of water necessary to react with the functionally effective glass-binding groups so that a substantial part of the functionally effective groups will be present at the time of use and application of the inner primary composition for radiation-cure on the optical glass fiber.

This amount of water includes any water initially present in the components of the inner primary composition, as well as any water introduced during the formulation of the inner primary composition. Water introduced during packaging and re-packaging of the inner primary composition should also be considered.

Hence, the components used to prepare the composition and the final formulated composition preferably will contain little or no water. The amount of water in the radiation-curable composition can be less than 0.08 wt. %, and preferably, less than 0.06 wt. %, and more preferably, less than 0.05 wt. %.

In a preferred method to control the water content of the composition, each batch of individual components is quality-screened to determine the water content prior to inclusion in the composition. Furthermore, making and re-packaging of the coating composition preferably is done under anhydrous conditions. Thus, selection of components comprising the least amount of water are preferred according to the invention. Using the present invention, a person skilled in the art is able to determine an acceptable amount of water which still gives a storage stable coating. Hence, economic considerations may be taken into account and still result in selection and use of components with an acceptable amount of water, as long as the teaching of this invention is adhered to.

Methods for determining the amount of water in inner primary compositions are known in the art. For example, the amount of water present in the components used to make the inner primary composition and the amount of water in the inner primary composition formed can be measured via the well-known Karl-Fischer titration method. An example of the Karl-Fischer titration method is described in the Example section hereinbelow.

Usually, the amount of water should be carefully controlled to be less than the stoichiometric amount of water which will react with the functionally-effective glass binding groups which are present. Thus, for each equivalent of said groups the amount of water should be controlled to be less than one equivalent.

When determining the amount of water allowable in the inner primary composition, the effects of hydrolysis of one or more of the functional groups on other non-hydrolyzed, functionally-effective glass binding functional groups should be considered. For example, by hydrolyzing one of the glass binding functional groups on the coupling agent, the remaining non-hydrolyzed functional groups may no longer be capable of binding to glass. In this manner, the stoichiometric amount of water to the functional groups may be less than the actual number of such groups originally present in the coupling agent before being effected by water. More particularly, it is recognized that while three functional groups may be present on the coupling agent only one of these will be effective for adhesion promotion and glass binding functionality. If one such group is hydrolyzed the other two functional groups may be unable, or less able, to bind effectively to the glass surface. The calculated stoichiometric amount of water in such a case should be with respect to the first, active group and not with respect to the other two inactive (or less active) functional groups.

In some instances, the amount of water which will be sufficient to hydrolyze all of the functionally-effective glass-binding groups (excluding those functional groups unable to bind to glass after hydrolysis of one or more other glass-binding groups present on the coupling agent) may be significantly less than the calculated stoichiometric amount of water as a result of by-product water generated via autogenous condensation reactions taking place within the composition. If such by-product water is generated, the free water content of the composition components should be controlled to a level less than the calculated stoichiometric amount of water for reaction with all of the said functional groups.

An example of a coupling agent system which may produce water via condensation is illustrated by the following two reactions:

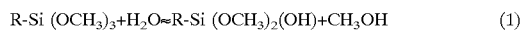  (1)

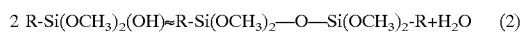  (2)

wherein R is a hydrocarbon or functionalized hydrocarbon.

The determination of the amount of water necessary to hydrolyze the functional groups according to the formulae 1 and 2 will be explained by way of the following example for a composition containing 1 wt. % of a gamma-mercaptopropyltrimethyoxysilane coupling agent. In 100 grams of inner primary composition of the formulated composition, 1 gram of the above mercaptosilane will provide 0.0051 molar equivalents of functionally-effective glass-binding —Si—OCH$_3$ groups. This calculation assumes that two of the —Si—OCH$_3$ groups may be excluded from the equivalence calculation since once one of the three —Si—OCH$_3$ groups is hydrolyzed the other two are usually functionally ineffective for binding to glass under typical radiation-curing coating conditions.

If there is also present 0.04 gram of water in the composition, this is effectively 0.0022 molar equivalents of OH groups (assuming reaction of only one hydroxyl group of water, as shown in reaction 1). In the hydrolysis reaction of formula 1, 0.0022 equivalents of water will hydrolyze 0.0022 equivalents of the functionally effective glass-binding —Si—OCH$_3$ groups, leaving 0.0029 equivalents of functionally effective glass-binding —Si—OCH$_3$ groups in the inner primary composition. However, if after such hydrolysis of the first —Si—OCH$_3$ groups, one or more of the remaining —Si—OCH$_3$ groups is functionally-effective the calculations should be adjusted to include those remaining equivalents of —Si—OCH$_3$ groups. Now, the resulting hydrolyzed mercaptosilane may nonetheless undergo a condensation reaction according to the above formula (2) to generate in situ an additional 0.0011 equivalents of by-product water. This additional 0.0011 equivalents of water is then capable of hydrolyzing an additional 0.0011 equivalents of functionally-effective glass-binding —Si—OCH$_3$ groups, and so on.

When the coupling agent selected behaves according to the formulae 1 and 2 under normal storage conditions, the amount of water sufficient to hydrolyze the functionally-effective glass-binding functional groups will be approximately one half of the calculated stoichiometric amount of water for the functionally-effective glass-binding functional groups. This amount can be approximated with use of the following equation:

$$X = \sum_{n=1}^{\infty} X_n$$

wherein $X_n = 1/(2^{n-1})$; and wherein n represents the number of times the hydrolysis and condensation reactions are repeated, which theoretically is infinite. From this equation, the summation value X can be determined to converge at X=2 as n approaches infinity. The value 1/X then equals the equivalents of water necessary to react with one equivalent of the functionally-effective glass-binding functional groups. Therefore, ½ equivalent of water is sufficient to react with one equivalent of the functionally-effective glass-binding groups.

Based on the disclosure herein, one of ordinary skill in the art will be generally able to determine the equivalents of water which will be effective to hydrolyze the equivalents of the said functionally-effective glass-binding functional groups present in other systems which might exhibit different hydrolysis/condensation reaction behavior other than as illustrated in formulae 1 and 2.

Normal storage conditions of the inner primary composition include shipping and handling of the inner primary composition, as well as the conditions under which the inner primary composition is stored by the end-user prior to application to the glass fibers. Because inner primary compositions are reactive, they are usually stored at room temperature or below. At elevated temperatures the inner primary composition can react. Preferably, the storage temperature is less than about 40° C. and greater than the freezing temperature of the composition.

The invention will be further explained by the following non-limiting examples.

EXAMPLE 1

The amount of water necessary to hydrolyze the functionally-effective glass-binding groups of gamma-mercaptopropyltrimethoxysilane was determined. Gamma-mercaptopropyltrimethoxysilane contains in theory at least three alkoxy groups which are capable of binding to glass. However, it has been found that when one of the three alkoxy groups reacts with water via hydrolysis to form a hydroxyl group the other two alkoxy groups are significantly less active or are entirely unable to effect a bonding of the coating composition with the glass fiber surface under typical radiation-curing conditions and subsequent storage of coated glass.

It has also been found that the gamma-mercaptopropyldimethoxyhydroxysilane formed from the hydrolysis of gamma-mercaptopropyltrimethoxysilane will undergo an in situ condensation reaction according to the above formula 2 to produce water under normal shelf storage conditions.

EXAMPLE 2

The effect of the amount of water present in radiation-curable, inner primary, glass optical fiber compositions on the adhesion of the cured inner primary coating to glass was tested. Two radiation-curable compositions were made using the components shown in Table 1. The amount of water was varied, as shown in Table 2. Variance of water content was the result of determining the amount of water in each of the components prior to making the compositions. For example, Ethoxylatednonylphenolmonoacrylate, available as SR504A (Sartomer), determined to have a relatively low water content, was selected for use in sample 1 and Photomer 4003, determined to have a relatively high water content, was selected for use in sample 2.

The compositions of sample 1 and sample 2 after aging under normal storage conditions were tested to determine the amount of effective adhesion promoter remaining in the compositions.

Sample 1, the composition known to have the lower water content initially was determined to retain the higher level of effectiveness over time.

TABLE 1

| Component | Weight % |
| --- | --- |
| Radiation-Curable Oligomer[1] | 56 |
| Photoinitiator[2] | 3 |
| Antioxidant[3] | .5 |
| Isodecylacrylate | 14 |
| Ethoxylatednonylphenolmonoacrylate | 25.5 |
| Gamma-Mercaptopropyltrimethoxysilane | 1 |

[1]HEA-(IPDI-PPG 1025)$_{1.06}$-(IPDI-Permanol)$_{1.14}$-IPDI-HEA
HEA = hydroxyethylacrylate
IPDI = isophoronediisocyanate
PPG1025 = polypropyleneglycol
Permanol = polycarbonatepolyol
[2]75/25 blend of 2-hydroxy-2-methyl-1-phenyl-propan-one and bis(2,6-dimethoxybenzoyl)-2,4,4-trimethylpentylphosphineoxide
[3]Thiodiethylene bis(3,5-di-tert-butyl-4-hydroxy)hydrocinnamate

TABLE 2

| | Amount of Water (wt %) | Amount of Effective Adhesion Promoter (wt %) | | |
| --- | --- | --- | --- | --- |
| Sample | | Initial | 1 Month | 3 Months |
| 1 | .02 | 1.05 | 1.04 | .98 |
| 2 | .07 | .98 | .80 | .57 |

Test Procedures
Determination of Water content

The water content was determined using a Karl-Fischer titration method, as described in ASTM D 1364. Because it is known that mercaptans interfere with the Karl-Fischer titration method, samples were tested prior to addition of gamma-mercaptopropyltrimethoxysilane. Each sample was dissolved in pyridine and titrated directly with Karl-Fischer reagent to an electrometric end point. A catalyst, 1-ethylpiperidine, was added to accelerate the reaction between water and the sulfur dioxide—iodine present in the Karl-Fischer reagent.

A Brinkmann-Metrohm-Herisau apparatus was used. The apparatus included a 658 KF processor, a 655 dosimat, a 681 pump unit, a titration vessel with cover, two dark-glass bottles (one of solvent and the other for surplus liquid), the associated tubing to connect these to the pump and titration vessel cover, and a magnetic stirring bar (teflon coated).

A solvent was made by adding 50 ml of 1-ethylpiperidine to a 1 liter volumetric flask and diluting it to the 1 liter mark with pyridine. The solution was mixed thoroughly to insure a uniform composition, and poured into the dark-glass bottle that was designated for solvent supply.

The Karl-Fischer reagent was first standardized as follows. The solvent was added to the vessel. The stirring motor was turned on and the speed adjusted so the vortex formed in the solvent was at least 1 cm deep. The "COND" button on the processor keyboard was pressed so that Karl-Fischer reagent was pumped into the vessel until an end point was detected. When the end point was reached, the "ready" light came on. The "Standby" button on the Processor keyboard was then pressed and a light on the keyboard labeled "St.by" came on, indicating readiness for the titration step. 20 to 40 $\mu l$ of water was drawn into the 50 $\mu l$ syringe and the syringe and water were weighed to the nearest 0.1 mg. The water was then injected into the vessel through the septum on the cover and the emptied syringe was weighed. The weight of the injected water was calculated by the difference in weight measurements obtained. The button labeled "Sample Mass" was pressed and the weight of the water was entered.

The process of titration of the water injected by addition of the Karl-Fischer reagent was then started. The solution was light in color, while the Karl-Fischer reagent was dark brown, due to its iodine content. The approach of -the end point was signaled by darkening of the liquid in the vessel. The Dosimat stopped adding reagent shortly after the darkening was seen. At the end of the titration, three values were printed on the printer paper: SAMPLE (the weight just entered), TITR. VOL, (in ml) and KFR TITER (in mg/ml). The unit was then reset and the above process was repeated two more times so that a total of three titer determinations were done. The MEAN of the three values was then calculated. The MEAN was then entered as the titer determination.

The amount of water in the test samples was then determined. The following table was used to select the appropriate sample weight based on the expected water content of the sample:

| Expected % H$_2$O | Sample Wt. (g) |
|---|---|
| 0.02–0.5 | 10 |
| 0.5–5.0 | 1 |
| 5.0–10.0 | 0.1 |

Based on the expected amount water, an appropriate amount of sample liquid was drawn into a disposable syringe and weighed to the nearest 0.1 mg. The sample was then injected into the vessel. The empty syringe was weighed and the amount of sample was calculated by taking the difference between the weight measurements. The sample was then titrated. At the end point, a three-line message was printed out: "REF. NO", "TITR. VOL.", and "WATER". This process was repeated for each sample.

The water content of each replicate sample was calculated using the equation:

$$\% \text{ Water} = \frac{0.1 \times \text{Wt. Water (mg)}}{\text{Wt. Sample (grams)}}$$

The average of the replicates was calculated and reported as the water content of the sample.

Determination of Activity of Coupling Agent

Following determination of the amount of water using the Karl-Fischer titration method, the gamma-mercaptopropyltrimethoxysilane was added to the sample. A drop of the sample was placed on a clean, dry sodium chloride disk. A spacer was then placed on the disk. This disk was covered with a second disk and pressure was applied so that the coating spread evenly to the edge of the disks. The film between these disks was free of air bubbles. The coating in the sandwiched disks was cured by exposure to UV light. This procedure was repeated using a different amount of the sample.

Infra-red transmission spectra of the cured samples was obtained using a Nicolet 5SXC with a standard TGS detector, as follows. The samples were then scanned. The spectra were then converted to absorbance. Each spectrum in the 700 cm$^{-1}$ to 1000 cm$^1$ region of the spectrum was examined. The maximum absorbance in the 790 cm$^{-1}$ to 920 cm$^{-1}$ region was between 0.5 and 1.3.

Standards of the coating containing approximately 0%, 0.25%, 0.5%, 0.75%, 1.0% and 1.25% of mercaptosilane were made. Cured films of each of the standards were made, in duplicate, using the above procedures. The cured films were then scanned. The mercaptosilane absorbance ratio in each calibration spectrum was calculated. The average absorbance ratio of the two replicates for each calibration standard was determined. Using the absorbance ratio and the concentration of each standard, the equation of the best fit line through the data points using linear regression analysis was obtained. Using this equation, the amount of active or effective mercaptosilane in the samples was determined from the spectra based on the disappearance of the Si—O—Me linkage. The average of the two replicates from each sample was determined and reported.

What is claimed is:

1. A process comprising:
   forming a plurality of radiation-curable coating composition batches,
   wherein the composition batches comprise, as a premixture ingredient, a trialkoxy silane coupling agent containing at least one hydrolyzable group;
   wherein at least one of the ingredients used to form said composition batches comprises water; and
   wherein in each batch the molar ratio of water to hydrolyzable trialkoxy silane coupling agent is less than 0.5.

2. The process of claim 1, wherein the trialkoxy silane coupling agent content in each composition batch is, relative to the total weight of the composition batch, from 0.3 wt % to 5 wt %.

3. The process of claim 1, wherein each batch provides an extended shelf-life.

4. The process of claim 1, wherein the water content in each batch is, relative to the total weight of the batch, less than 0.08 wt %.

5. The process of claim 1, wherein the trialkoxy silane coupling agent content in each composition batch is, relative to the total weight of the composition batch, between about 0.5 wt % and about 3 wt %.

6. The process of claim 1, wherein the trialkoxy silane coupling agent content in each composition batch is, relative to the total weight of the composition batch, between about 0.75 wt % and about 1.5 wt %.

7. The process of claim 1, wherein the water content in each batch is, relative to the total weight of the batch, less than 0.05 wt %.

8. The process of claim 1, wherein said trialkoxysilane coupling agent is gamma-mercaptopropyltrimethoxysilane.

9. The process of claim 1, wherein said composition batches comprise an alkoxylated nonyl phenol acrylate.

10. The process of claim 1, wherein said at least one of the ingredients includes ethoxylated nonyl phenol acrylate.

11. The process of claim 1, wherein each composition batch comprises:
    (a) between about 10 wt % and about 90 wt % of at least one radiation curable oligomer;
    (b) between about 10 wt % and about 90 wt % of at least one monomer diluent;
    (c) between about 0.3 wt % and about 5 wt % of said trialkoxy silane coupling agent; and
    (d) optionally, between about 0.3 wt % and 10 wt % of a photoinitiator;
    wherein all weight percentages are relative to the total weight of said each composition batch.

12. The process of claim 11, wherein said each composition batch comprises between about 0.75 wt % and about 1.5 wt % of said trialkoxysilane coupling agent.

13. The process of claim 12, wherein said at least one oligomer includes a polyether urethane acrylate oligomer.

14. The process of claim 12, wherein said each composition batch comprises an alkoxylated nonyl phenol acrylate.

15. The process of claim 12, wherein said trialkoxy silane coupling agent is gamma-mercaptopropyltrimethoxysilane.

16. The process of claim 15, wherein said each composition batch comprises an alkoxylated nonyl phenol acrylate.

* * * * *